2,746,973

5-ALKYLMERCAPTO-2-HETEROCYCLIC ALDEHYDES AND KETONES

Walter A. Gregory, Wilmington, Del., and Algird Kreuchunas, Detroit, Mich., assignors to E. I. du Pont de Nemours and Company, Wilmington, Del., a corporation of Delaware No Drawing. Application May 27, 1955,
Serial No. 511,774

6 Claims. (Cl. 260—332.3)

This invention relates to a process for preparing 5-alkylmercapto-2-heterocyclic aldehydes and ketones. More particularly, the invention is concerned with a process for preparing alkyl (5-alkylmercapto-2-thienyl) ketones, alkyl (5-alkylmercapto-2-furyl) ketones, 5-alkylmercapto-2-thiophenecarboxaldehydes and 5-alkylmercapto-2-furaldehydes. The invention is further directed to the ketones and aldehydes prepared.

The present application is a continuation-in-part application of our copending case Serial No. 387,313, filed October 20, 1953, now abandoned, which is in turn a continuation-in-part of our parent case Serial No. 298,843, filed July 14, 1952, now abandoned; and is in part a continuation of the copending applications of Algird Kreuchunas Serial Nos. 304,211, now abandoned, and 309,370, filed August 13, 1952, and September 12, 1952, respectively.

The 5-alkylmercapto-2-heterocyclic aldehydes and ketones of our invention are represented by the general formula

1.

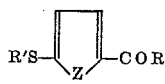

In this formula R represents hydrogen or lower alkyl, R' represents a lower alkyl radical and Z represents oxygen or sulfur. By lower alkyl we mean an alkyl radical having not more than 6 carbon atoms.

The compounds of Formula 1 are prepared in accordance with the present invention by mixing a compound of the formula

2.

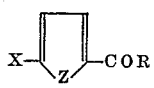

where R and Z have the same significance as in Formula 1 and X is a member of the group consisting of chloro, bromo and iodo radicals, with an alkali metal alkyl mercaptide of the formula

3.      R'SM where R' has the same significance as in Formula 1 and M is sodium or potassium, in a liquid medium.

The 5-halo-2-furaldehydes, that is, the compounds of Formula 2 wherein Z is oxygen and R is hydrogen, can be prepared as shown in A. A. Morton's "The Chemistry of Heterocyclic Compounds," McGraw-Hill Book Company, Inc., 1946, pages 4–5. The 5-halo-2-thiophenecarboxaldehydes can be prepared as described in J. Am. Chem. Soc. 72, 1422 (1950).

The aldehydes and ketones of Formula 2 are preferably refluxed with an alcoholic solution of an alkali metal alkyl mercaptide, the alkali metal being one having an atomic number of at least 11 but no greater than 19. The preferred solvents for the alkali metal alkyl mercaptide are the lower aliphatic alcohols such as, for example, methanol, ethanol, isopropanol and n-butanol.

The desired product represented by Formula 1 is isolated from the reaction mixture by pouring the mixture into water. The product, which separates, is then collected. It can be purified by distillation or crystallization.

Illustrative of the ketones prepared according to the process of our invention are:

Ethyl (5-ethylmercapto-2-thienyl) ketone
Methyl (5-n-butylmercapto-2-thienyl) ketone
Amyl (5-isopropylmercapto-2-thienyl) ketone
Hexyl (5-methylmercapto-2-thienyl) ketone
n-Propyl (5-n-hexylmercapto-2-thienyl) ketone
Isopropyl (5-isopropylmercapto-2-thienyl) ketone
n-Butyl (5-methylmercapto-2-thienyl) ketone
n-Butyl (5-butylmercapto-2-thienyl) ketone
Methyl (5-ethylmercapto-2-furyl) ketone
Ethyl (5-hexylmercapto-2-furyl) ketone
Ethyl (5-n-propylmercapto-2-furyl) ketone
n-Propyl (5-ethylmercapto-2-furyl) ketone
Isopropyl (5-isobutylmercapto-2-furyl) ketone
n-Propyl (5-n-amylmercapto-2-furyl) ketone
n-Butyl (5-methylmercapto-2-furyl) ketone
5-ethylmercapto-2-thiophenecarboxaldehyde
5-n-butylmercapto-2-thiophenecarboxaldehyde
5-isoamylmercapto-2-thiophenecarboxaldehyde
5-n-hexylmercapto-2-thiophenecarboxaldehyde
5-isopropylmercapto-2-furaldehyde
5-ter-amylmercapto-2-furaldehyde
5-n-hexylmercapto-2-furaldehyde The compounds of the present invention are useful in the preparation of other organic compounds and find particular use as intermediates in the preparation of such synthetic antibiotics as:

(dl) - threo - 1 - (5 - methylsulfonyl - 2 - furyl) - 2 - (alpha, alpha - dichloroacetamido) - 1,3 - propanediol,
(dl) - threo - 1 - (5 - ethylsulfonyl - 2 - furyl) - 2 - (alpha, alpha - dichloroacetamido) 1,3 - propanediol,
(dl) - threo - 1 - (5 - n - propylsulfonyl - 2 - furyl) - 2 - (alpha, alpha - dichloroacetamido) - 1,3 - propanediol,
(dl) - threo - 1 (5 - methylsulfonyl - 2 - thienyl) - 2 - (alpha, alpha - dichloroacetamido) - 1,3 - propanediol,
(dl) - threo - 1 - (5 - ethylsulfonyl - 2 - thienyl) - 2 - (alpha, alpha - dichloroacetamido) - 1,3 - propanediol,
(dl) - threo - 1 - (5 - n - propylsulfonyl - 2 - thienyl) - 2 - (alpha, alpha - dichloroacetamido) - 1,3 - propanediol.

The conversion of compounds of the present invention to the biologically active 1-(5-alkylsulfonyl-2-thienyl)-2-amido-1,3-propanediol is fully described and claimed in the copending application of Algird Kreuchunas, Serial No. 304,211, filed August 13, 1952.

In brief, the synthesis of Kreuchunas' application, Serial No. 304,211, comprises oxidizing a methyl (5-alkylmercapto-2-thienyl) ketone of our invention to a methyl (5-alkylsulfonyl-2-thienyl) ketone using hydrogen peroxide. The methyl (5-alkylsulfonyl-2-thienyl) ketone is brominated and the resulting bromomethyl (5-alkylsulfonyl-2-thienyl) ketone is mixed in ethylidene dichloride with hexamethylenetetramine to obtain N-(5-alkylsulfonyl-2-thenoylmethyl hexamethylenetetraminium bromide. The tetraminium salt is converted to (hydroxymethylamino) methyl (5-alkylsulfonyl-2-thienyl) ketone sulfite using sulfur dioxide and water. The sulfite is converted to N-(5-alkylsulfonyl-2-thenoyl) methylamine hydrochloride using hydrochloric acid, and the hydrochloric is in turn acylated. The resulting amide derivative is subjected to an aldol type of condensation (hydroxymethylation) to yield a compound of the formula

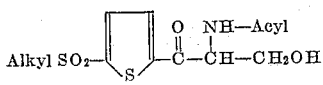

The carbonyl group of the above compound is reduced to give the desired biologically active product using sodium borohydride or the Meerwein-Ponndorf-Verley method.

The conversion of the alkyl (5-alkylmercapto-2-furyl) ketones of our invention to pharmaceutically active products is fully described and claimed in the copending Kreuchunas application, Serial No. 309,370, filed September 12, 1952. The conversion is similar to the one already described for the thienyl derivatives.

Additionally, the aldehydes and ketones of this invention are useful as corrosion inhibitors.

The acid corrosion of steel, say, in the presence of a mineral acid such as 5% sulfuric acid, is substantially inhibited when a minor quantity of a compound of the invention is added to the acid system. Uninhibited acid-steel systems corrode at least 2½ times faster than systems containing one or more of our novel compounds.

In order to better understand our invention reference should be had to the following illustrative examples:

EXAMPLE 1

*Preparation of methyl (5-methylmercapto-2-thienyl) ketone*

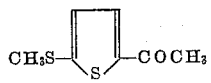

To a solution of 39 g. of potassium hydroxide in 500 ml. of ethanol at 25° C. there is added over a period of thirty minutes 28.3 g. of gaseous methyl mercaptan. 120 g. of methyl (5-bromo-2-thienyl) ketone is then added in one portion. The reaction mixture is stirred and refluxed for a period of three hours. The mixture is cooled and poured into 3 l. of water. A yellow solid separates consisting essentially of methyl (5-methylmercapto-2-thienyl) ketone. It is collected by filtration and dried. The yield of product is 100 g., M. P. 52–53° C. If desired, the material may be recrystallized from hexane.

*Anal.*—Calcd. for $C_7H_8OS_2$: C, 48.81; H, 4.68; S, 37.22. Found: C, 49.12; H, 4.75; S, 37.16.

EXAMPLE 2

*Preparation of methyl (5-ethylmercapto-2-thienyl) ketone*

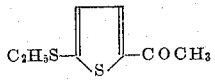

A solution of sodium ethyl mercaptide is prepared by dissolving 25.3 g. of sodium metal in 1 liter of ethanol. To this ethanolic solution at 25° C. there is added slowly 68.2 g. of ethyl mercaptan followed by 205 g. of methyl (5-bromo-2-thienyl) ketone in one portion. The resulting mixture is stirred and refluxed for a period of ten hours. The reaction mixture is poured into 4 l. of water. The low melting solid which separates is methyl (5-ethylmercapto-2-thienyl) ketone. It is collected by filtration, washed with 200 ml. of water and dried to give a yield of 165 g.

EXAMPLE 3

*Preparation of ethyl (5-methylmercapto-2-thienyl) ketone*

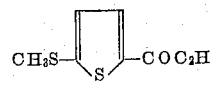

To a solution of 39 g. of potassium hydroxide in 500 ml. of ethanol at 25° C. there is added over a period of thirty minutes 28.3 g. of gaseous methyl mercaptan. Next, 120 g. of ethyl (5-bromo-2-thienyl) ketone is added to the above-described reactants in one portion. The reaction mixture is stirred and refluxed for a period of three hours. The mixture is then cooled and poured into 3 l. of water. The product, ethyl (5-methylmercapto-2-thienyl) ketone, is extracted with benzene, dried and distilled. A yield of 95 g. is obtained.

EXAMPLE 4

*Preparation of n-propyl (5-ethylmercapto-2-thienyl) ketone*

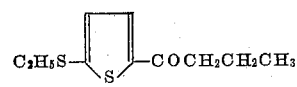

To a solution of 39 g. of potassium hydroxide in 500 ml. of ethanol at 25° C. there are added slowly 36.6 g. of ethyl mercaptan, followed by a single portion addition of 103.7 g. of n-propyl (5-chloro-2-thienyl) ketone. The reaction mixture is refluxed for a period of ten hours. It is then cooled and poured into 3 l. of water. The desired product comprising n-propyl (5-ethylmercapto-2-thienyl) ketone, is extracted with benzene and distilled.

EXAMPLE 5

*Preparation of methyl (5-methylmercapto-2-furyl) ketone*

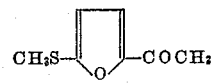

To a solution of 39 g. of potassium hydroxide in 500 ml. of ethanol at 25° C. there are added in sequence 28.3 g. of gaseous methyl mercaptan and 104 g. of methyl (5-bromo-2-furyl) ketone. The reaction mixture is refluxed for a period of three hours, cooled and poured into 3 l. of water. The resulting methyl (5-methylmercapto-2-furyl) ketone is extracted with benzene and distilled. An eighty gram yield is realized.

EXAMPLE 6

*Preparation of isopropyl(5-isopropylmercapto-2-furyl) ketone*

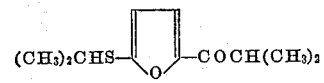

A solution of sodium isopropyl mercaptide is prepared by dissolving 25.3 g. of sodium metal in 1 liter of methanol, cooling to a temperature of 25° C. and adding slowly 83.6 g. of isopropyl mercaptan. To this mixture, there is added in one portion 217 g. of isopropyl (5-bromo-2-furyl). The resulting mixture is refluxed for a period of three hours, cooled and poured into 4 liters of water. The isopropyl (5-isopropylmercapto-2-furyl) ketone thus produced is extracted with benzene, dried, and distilled. The yield is 195 g.

EXAMPLE 7

*Preparation of n-propyl(5-n-propylmercapto-2-furyl) ketone*

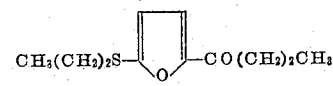

To a solution of 39 g. of potassium hydroxide in 500 ml. of ethanol at 25° C. there is added 44.8 g. of n-propyl mercaptan. Next, 95 g. of n-propyl (5-chloro-2-furyl) ketone is added in one portion. The resulting mixture is refluxed for a period of twelve hours, cooled and poured into 3 l. of water. The product, n-propyl (5-n-propylmercapto-2-furyl) ketone, is extracted with benzene, dried and distilled. The yield of the desired ketone is 96 g.

EXAMPLE 8

*5-methylmercapto-2-thiophenecarboxaldehyde*

To a solution of 56.1 grams of potassium hydroxide in 500 ml. of n-butanol at 25° C. there is added over a period of 45 minutes 48 g. of gaseous methyl mercaptan. 191 g. of 5-bromo-2-thiophenecarboxaldehyde is then bubbled into this solution. The reaction mixture is stirred under reflux for a period of 3 hours. Potassium bromide is filtered off and the butanol solution vacuum concentrated. The product, having the structure,

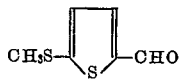

is purified by distilling under reduced pressure.

EXAMPLE 9

*5-isopropylmercapto-2-thiophenecarboxaldehyde*

This compound is prepared exactly as in Example 8 except 80 g. of isopropyl mercaptan is added by a dropping funnel instead of bubbling in gaseous methyl mercaptan. The product, having the structure

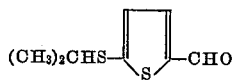

is isolated and purified in the same manner as in Example 8.

EXAMPLE 10

*5-n-propylmercapto-2-thiophenecarboxaldehyde*

This compound is prepared, isolated and purified as in Example 8 except 80 g. of n-propyl mercaptan is added by a dropping funnel instead of bubbling in gaseous methyl mercaptan. The product has the structure

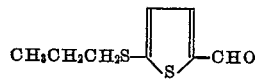

EXAMPLE 11

*5-methylmercapto-2-furaldehyde*

To a solution of 56.1 g. of potassium hydroxide and 500 ml. of ethanol at 25° C., there are added in sequence 48 g. of gaseous methyl mercaptan and 175 g. of 5-bromo-2-furaldehyde. The reaction mixture is refluxed for a period of 3 hours. The potassium bromide is filtered off and the ethanol solution vacuum concentrated. The product, having the structure

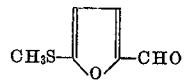

is purified by distilling under reduced pressure.

EXAMPLE 12

*5-ethylmercapto-2-furaldehyde*

This compound is prepared, isolated and purified in the manner described in Example 11 except 70 g. of ethyl mercaptan is added in place of the methyl mercaptan. The product has the structure

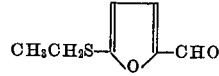

EXAMPLE 13

*5-n-butylmercapto-2-furaldehyde*

This compound is prepared, isolated, and purified as in Example 11 except 92 g. of n-butyl mercaptan is added by a dropping funnel instead of bubbling in the methyl mercaptan. The product has the structure

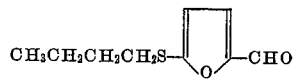

We claim:
1. A compound of the formula

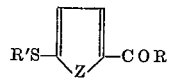

where R is a member of the group consisting of hydrogen and lower alkyl and R' is lower alkyl and Z is a member of the group consisting of oxygen and sulfur.
2. Methyl (5-methylmercapto-2-thienyl) ketone.
3. 5-methylmercapto-2-thiophenecarboxaldehyde.
4. 5-methylmercapto-2-furaldehyde.
5. Methyl (5-methylmercapto-2-furyl) ketone.
6. Methyl (5-ethylmercapto-2-thienyl) ketone.

No references cited.